(12) United States Patent
Petersen et al.

(10) Patent No.: US 7,905,798 B2
(45) Date of Patent: Mar. 15, 2011

(54) GOLF CLUB HEAD AND METHOD OF MANUFACTURING

(75) Inventors: David L. Petersen, Peoria, AZ (US); Michael Jakubowski, Glendale, AZ (US); John A. Solheim, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 116 days.

(21) Appl. No.: 12/189,606

(22) Filed: Aug. 11, 2008

(65) Prior Publication Data

US 2009/0209362 A1    Aug. 20, 2009

Related U.S. Application Data

(60) Provisional application No. 61/029,205, filed on Feb. 15, 2008.

(51) Int. Cl.
*A63B 53/04* (2006.01)
*B23B 3/00* (2006.01)
*B27M 1/00* (2006.01)

(52) U.S. Cl. ................ 473/331; 144/363; 82/1.11
(58) Field of Classification Search ............ 144/24.22, 144/24.24, 118, 134.1, 137, 150, 355, 363; 473/324–350
See application file for complete search history.

(56) References Cited

U.S. PATENT DOCUMENTS

| | | | | |
|---|---|---|---|---|
| 1,675,437 A * | 7/1928 | Waldron | ............ | 144/355 |
| 2,767,749 A * | 10/1956 | Brandon | ............ | 144/143 |
| 3,908,722 A * | 9/1975 | Jacobs | ............ | 144/24.24 |
| 4,631,993 A * | 12/1986 | Kelm | ............ | 82/1.11 |
| 4,750,537 A * | 6/1988 | Green | ............ | 144/363 |
| 4,766,698 A * | 8/1988 | Solomko | ............ | 451/226 |
| 5,090,702 A | 2/1992 | Viste | | |
| 5,163,682 A * | 11/1992 | Schmidt et al. | ............ | 473/332 |
| 5,358,249 A * | 10/1994 | Mendralla | ............ | 473/331 |
| 5,437,088 A * | 8/1995 | Igarashi | ............ | 29/527.6 |
| 5,505,450 A * | 4/1996 | Stuff | ............ | 473/329 |
| 5,709,617 A * | 1/1998 | Nishimura et al. | ............ | 473/330 |
| 6,007,434 A | 12/1999 | Baker et al. | | |
| 6,048,277 A | 4/2000 | Raymond | | |
| 6,398,665 B1 * | 6/2002 | Antonious | ............ | 473/330 |
| 6,813,821 B1 * | 11/2004 | Tseng | ............ | 29/527.6 |
| 6,904,663 B2 * | 6/2005 | Willett et al. | ............ | 29/557 |
| 6,981,923 B2 * | 1/2006 | Chappell | ............ | 473/330 |
| 7,156,751 B2 | 1/2007 | Wahl et al. | | |
| 7,258,627 B2 * | 8/2007 | Chappell | ............ | 473/331 |

(Continued)

FOREIGN PATENT DOCUMENTS

JP    05317463 A * 12/1993

(Continued)

OTHER PUBLICATIONS

Sympatico; A not-so-perfect Ending; http://sports.sympatico.msn.ca/Golf/TopStories/ContentPosting.aspx?newsitemid=1874&feedname=SCOREGOLF-EQUIPMENT&show=False&number=0&showbyline=True&subtitle=&detect=&abc=abc; Feb. 6, 2005; 3 pages.

*Primary Examiner* — Alvin A Hunter

(57) ABSTRACT

In one embodiment, a method for manufacturing a golf club head comprises forming a groove at a face of the golf club by rotating a groove forming tool about an axis of rotation at an angle substantially greater than zero degrees and substantially less than ninety degrees to the face of the golf club. Other embodiments are described herein.

21 Claims, 7 Drawing Sheets

U.S. PATENT DOCUMENTS

| | | |
|---|---|---|
| 7,273,422 B2 | 9/2007 | Vokey et al. |
| 7,275,999 B2 | 10/2007 | Sherwood |
| 7,285,057 B2 | 10/2007 | Mann, Jr. et al. |
| 7,568,983 B2 * | 8/2009 | Gilbert .......................... 473/330 |
| 7,594,862 B2 * | 9/2009 | Gilbert .......................... 473/330 |
| 7,674,188 B2 * | 3/2010 | Ban ............................... 473/330 |
| 7,677,990 B2 * | 3/2010 | Ban ............................... 473/331 |
| 7,695,377 B2 * | 4/2010 | Yamagishi et al. ........... 473/331 |
| 2002/0042306 A1 * | 4/2002 | Chappell ....................... 473/331 |
| 2002/0049095 A1 * | 4/2002 | Galloway et al. ............. 473/330 |
| 2003/0134687 A1 * | 7/2003 | Truesdale ..................... 473/330 |
| 2005/0043113 A1 | 2/2005 | Mann, Jr. et al. |
| 2007/0010346 A1 | 1/2007 | Gilbert et al. |
| 2007/0149312 A1 | 6/2007 | Gilbert |
| 2009/0036228 A1 * | 2/2009 | Ban et al. ...................... 473/331 |
| 2009/0082129 A1 * | 3/2009 | Ban et al. ...................... 473/331 |
| 2009/0298609 A1 * | 12/2009 | Gilbert et al. ................. 473/330 |

FOREIGN PATENT DOCUMENTS

| | | | |
|---|---|---|---|
| JP | 09253250 A | * | 9/1997 |
| JP | 10225539 A | * | 8/1998 |
| JP | 2000300702 A | * | 10/2000 |
| JP | 2000350799 A | * | 12/2000 |
| JP | 2002153575 A | * | 5/2002 |
| JP | 2002159601 A | * | 6/2002 |
| JP | 2005169129 A | * | 6/2005 |
| JP | 2008136619 A | * | 6/2008 |
| JP | 2008136833 A | * | 6/2008 |
| WO | WO 9506501 A1 | * | 3/1995 |

* cited by examiner

GOLF CLUB HEAD AND METHOD OF MANUFACTURING

CROSS REFERENCE TO RELATED APPLICATION

This application is a non-provisional application claiming priority to U.S. Provisional Patent Application No. 61/029,205, filed on Feb. 15, 2008, which is incorporated herein by reference.

TECHNICAL FIELD

This disclosure relates generally to a golf clubs, and relates more particularly to golf club heads having grooves.

BACKGROUND

Golf club manufacturers produce golf club heads with grooves at a golf club face. The manufacturers cut the grooves into the golf club face by rotating a groove cutter that may exhibit uneven wear and/or excessive vibrations.

Figure 1:
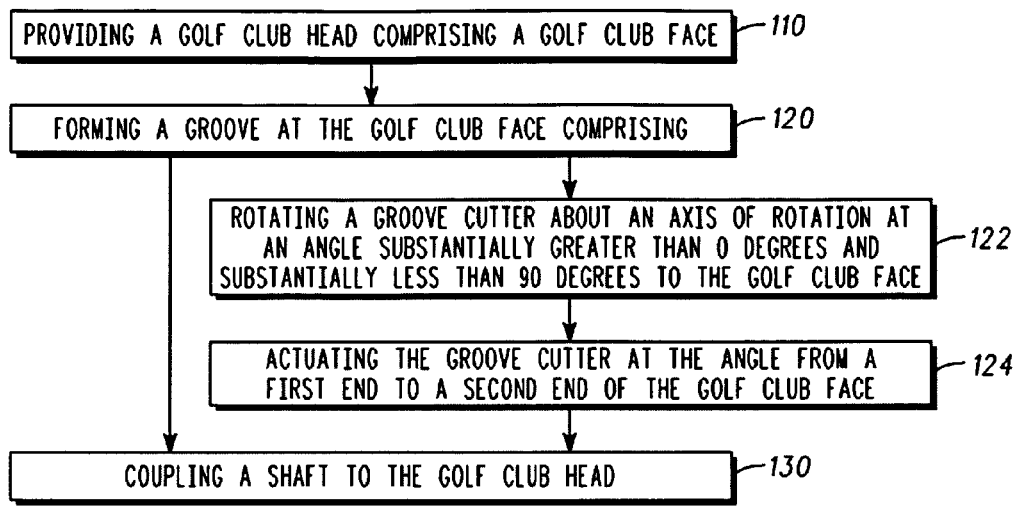
FIG. 1 depicts a flow diagram representation of one manner in which an exemplary golf club groove can be manufactured according to a first embodiment.

For simplicity and clarity of illustration, the drawing figures illustrate the general manner of construction. Descriptions and details of well-known features and techniques can be omitted to avoid unnecessarily obscuring a golf club method and article. Additionally, elements in the drawing figures are not necessarily drawn to scale. For example, the dimensions of some of the elements in the figures can be exaggerated relative to other elements to help improve understanding of the various exemplary embodiments of a golf club head and method of manufacture. When used, the same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the exemplary embodiments of a golf club head and method of manufacture described herein are, for example, capable of operation in sequences other than those illustrated or otherwise described herein. Furthermore, the terms "contain," "include," and "have," and any variations thereof, are intended to cover a non-exclusive inclusion, such that a process, method, article, or apparatus that comprises a list of elements is not necessarily limited to those elements, but can include other elements not expressly listed or inherent to such process, method, system, article, or apparatus.

The terms "left," "right," "front," "back," "top," "bottom," "side," "under," and the like in the description and in the claims, if any, are used for descriptive purposes and not necessarily for describing permanent relative positions. It is to be understood that the terms so used are interchangeable under appropriate circumstances such that the embodiments of a golf club head and method of manufacture described herein are, for example, capable of operation in other orientations than those illustrated or otherwise described herein. The term "coupled," as used herein, is defined as directly or indirectly connected in a physical, mechanical, or other manner.

DESCRIPTION OF EXAMPLES OF EMBODIMENTS

In an exemplary embodiment of a golf club head and method of manufacture, a method for manufacturing a golf club head can comprise providing a golf club head comprising a golf club face, and forming a groove at the golf club face. Forming the groove at the golf club face can comprise rotating a groove forming tool about an axis of rotation at an angle substantially greater than zero degrees and substantially less than 90 degrees to the golf club face, and actuating the groove forming tool at the angle from a first end to a second end of the golf club face. The method can further comprise forming a plurality of parallel grooves at the golf club face, and forming a golf club by coupling a shaft to the golf club head.

In an exemplary embodiment, a golf club can comprise, a golf club head comprising a golf club face, and a plurality of grooves at the golf club face. Each of the plurality of grooves extend from a first end to a second end of the golf club face, and the first end and the second end each comprise an elliptical portion. A first cross section of a first region of a groove is substantially proportional to a second cross section of a second region of the groove when the first cross section is taken perpendicular to a sidewall of the first region of the groove and when the second cross section is also taken perpendicular to the sidewall of the second region of the groove. A third cross section of the first region of the groove is substantially not proportional to a fourth cross section of the second region of the groove when the third cross section is taken perpendicular to a bottom of the first region of the groove and when the fourth cross section of the second region is also taken perpendicular to the bottom of the second region of the groove. In this embodiment, each of the first, second, third, and fourth cross sections are symmetric.

Among the various exemplary embodiments described herein, a groove forming tool can comprise a diameter between about 0.60 centimeters and about 3.1 centimeters, and the groove forming tool can comprise a length about equal to or less than a height of the golf club face. The orientation of the groove forming tool axis of rotation can comprise an angle between about 30 degrees and about 60 degrees from the golf club face, and in one embodiment, the angle of the groove forming tool axis of rotation is about 45 degrees. Exemplary angles of the groove forming tool axis of rotation can also be less than about 30 degrees and/or greater than about 60 degrees, but such exemplary angles are substantially greater than zero degrees and substantially less than 90 degrees from the golf club face. In another example, the orientation of the groove forming tool axis of rotation is at an angle between about 2 degrees and about 43 degrees, and in one embodiment, the angle is about 35 degrees.

Among the various embodiments disclosed herein, rotating the groove forming tool can comprise rotating the groove forming tool at a substantially constant velocity at a point of contact with the golf club face. The groove forming tool velocity can be between about 45 surface meters per minute and about 800 surface meters per minute, and in some embodiments, the groove forming tool velocity is between about 90 surface meters per minute and about 300 surface meters per minute.

As a result of the angled groove forming tool providing one or more grooves on the golf club face, the grooves can have an elliptical portion at each groove end, and many embodiments can comprise the elliptical portions to be located outside of an impact region of the golf club face. The various embodiments can comprise the groove ends to correspond to a first end, which can correspond to a toe region of the golf club face, and a second end, which can correspond to a heel region of the golf club face. Moreover, the groove ends at either the toe region or the heel region can taper up towards a rail region of the golf club face, or down towards a sole region of the golf club face.

According the various exemplary embodiments, the groove forming tool can be actuated in a single pass from the first end to the second end of the golf club face to form a groove, wherein the single pass forms the groove comprising substantially straight sidewalls. Moreover, different groove forming tools can be actuated in at least two passes from the first end to the second end of the golf club face to form a groove, where the passes form the groove to comprise substantially curved sidewalls. It should be noted that the exemplary embodiments disclosed can manufacture grooves that conform to rules and/or standards of golf defined by various golf standard organizations, governing bodies, and/or rule establishing entities such as the United States Golf Association (USGA) and the Royal and Ancient Golf Club of St. Andrews (R&A), but all embodiments are not limited in this regard.

Turning now to the figures, FIG. 1 depicts a flow diagram representation of one manner in which an exemplary golf club groove is provided according to a first embodiment. In an exemplary embodiment of a golf club head and method of manufacture, a method 100 for manufacturing a golf club head can comprise providing a golf club head comprising a golf club face (a block 110), and forming a groove at the golf club face (a block 120). Forming the groove at the golf club face can comprise, rotating a groove forming tool about an axis of rotation at an angle substantially greater than zero degrees and substantially less than 90 degrees to the golf club face (a block 122), and actuating the groove forming tool at the angle from a first end to a second end of the golf club face (a block 124). The method can further comprise forming a golf club by coupling a shaft to the golf club head (a block 130). Although a particular order of actions is outlined by the method in FIG. 1, these actions can be performed in other temporal sequences. For example, two or more actions depicted in FIG. 1 can be performed sequentially, concurrently, or simultaneously.

Figure 2:
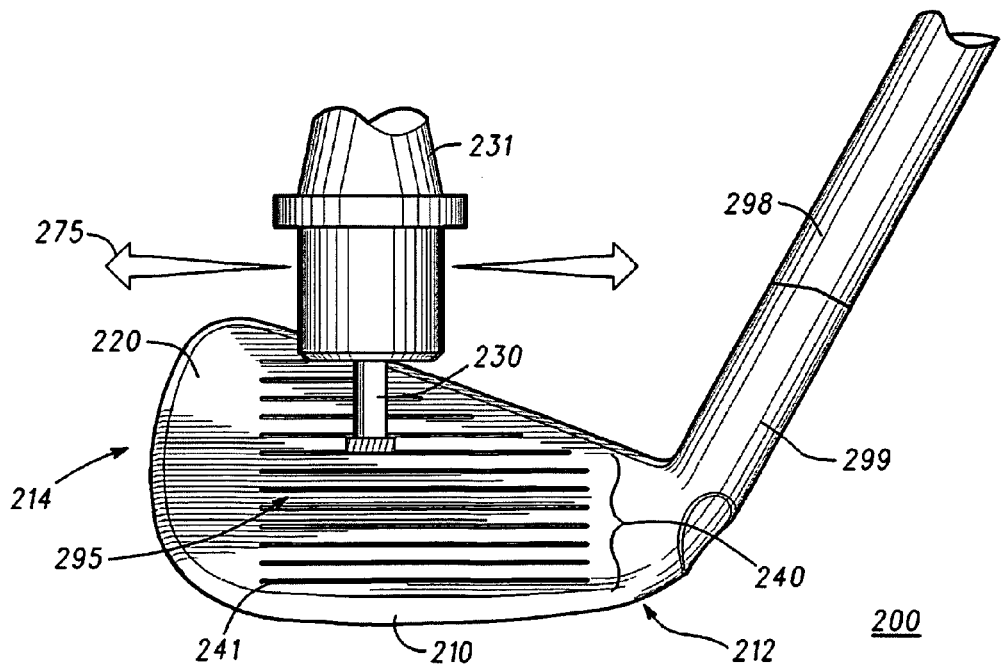
FIG. 2 depicts a front view of an exemplary groove forming tool engaged with a golf club head, according to the first embodiment.
Figure 5:
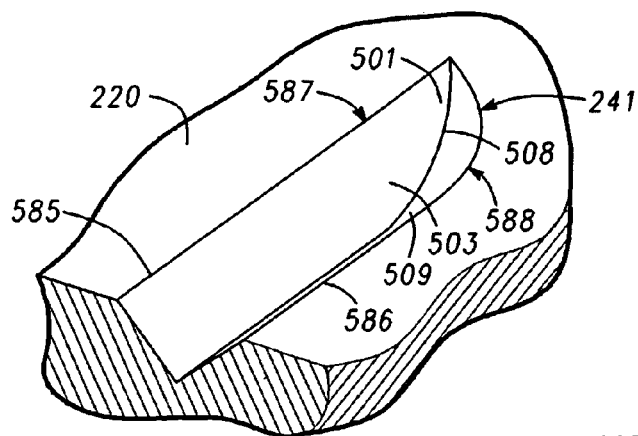
FIGS. 5-6 depict close-up cross-section views of elliptical portions of exemplary grooves according to embodiments of a method of manufacture described herein.

Among the various exemplary embodiments, the method embodies, with reference to FIG. 2, groove forming tool 230 that can engage with golf club head 210 to provide grooves 240 at golf club face 220. Golf club 200 comprises golf club head 210 comprising golf club face 220, and a plurality of grooves 240 at golf club face 220. Each of grooves 240 extend from a first end 214 (e.g., a toe end) to a second end 212 (e.g., a heel end) of golf club face 220. First end 214 and second end 212 can each comprise an elliptical portion, for example, elliptical portion 501 (FIG. 5). Golf club 200 can further comprise an impact area 295, and a golf club shaft 298. Golf club shaft 298, when coupled to golf club head 210 at hosel 299, can form exemplary golf club 200. Golf club shaft 298 can be uncoupled from golf club head 210 during formation of grooves 240.

As depicted in FIG. 2, which shows a front view of golf club head 210 engaged with groove forming machine 231, groove forming tool 230 can be part of groove forming machine 231. Groove forming machine 231 can secure groove forming tool 230, and can also actuate groove forming tool 230 to provide grooves 240. Groove forming tool 230 can be removable from groove forming machine 231 so that variable sizes or replacement groove forming tools 230 can be used. For example, different groove forming tools can comprise different diameters, lengths, and/or materials.

In one embodiment, groove forming machine 231 moves in either direction 275 across golf club face 220 to allow actuated groove forming tool 230 to form grooves 240. In another embodiment, groove forming machine 231 can remain stationary, and golf club head 210 can move in either direction 275 to form grooves 240. In still yet another embodiment, both groove forming machine 231 and golf club head 210 can simultaneously move in opposite directions to form grooves 240.

Among the exemplary embodiments, and as depicted in FIG. 2, golf club face 220 comprises a plurality of grooves 240 that, in one embodiment, are parallel to each other. Groove forming tool 230, as part of groove forming machine 231, can form each of grooves 240. After a first one of grooves 240 is formed, groove forming machine 231 can be repositioned to allow groove forming tool 230 to form a second one of grooves 240 parallel to the one of grooves 240. The process can be repeated until each of grooves 240 is formed. As will be described in greater detail later, each of grooves 240 formed by groove forming tool 230 and groove forming machine 231 can be formed in a single pass, or can be formed using multiple passes.

Among the various embodiments, golf club head 210 comprises impact area 295. Impact area 295 represents a striking area for a ball when an individual uses golf club 200. The impact area can comprise various sizes, shapes and dimensions depending on the golf club, and in general, grooves 240 can extend outside of a perimeter of impact area 295. Grooves 240, in impact area 295, are used to impart "bite" and/or "spin" on a golf ball (not shown) under many conditions when an individual uses golf club 200, and various groove forming tools can be used to form various grooves comprising different groove depths, widths, or other groove characteristics to impart different "bite" and/or "spin" on the golf ball under those conditions.

Figure 3:
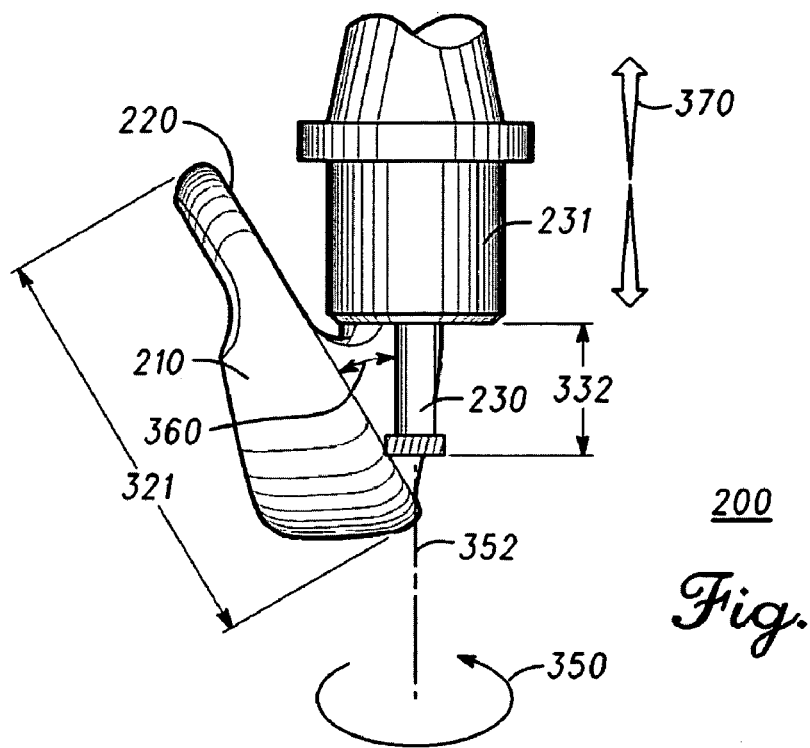
FIG. 3 depicts a side view of the exemplary groove forming tool engaged with the golf club head, according to the embodiment of FIG. 2.

Among various exemplary embodiments, FIG. 3 depicts a side view of groove forming tool 230 engaged with golf club head 210, similar to the front view shown in FIG. 2. Groove forming tool 230 can comprise a length 332 about equal to or less than a height 321 of golf club face 220. By optimizing the length of groove forming tool 230, method 100 can be carried out such that length 332 is long enough so that groove forming machine 231 and golf club head 210 do not interfere with each other during the groove milling, grinding, abrading, or cutting operation. In other words, if groove forming tool 230 is too short, at a particular angle, groove forming machine 231 will interfere with an upper portion of golf club face 220 as groove forming tool 230 tries to impart groove 241 in a lower portion of golf club face 220. Moreover, length 332 should be short enough so that, excessive vibrations do not occur by the rotation of groove forming tool 230, and excessive moments are not induced by the force of groove forming tool 230 on golf club face 220, which might result in grooves 240 having less than desirable dimensional tolerances.

The orientation of groove forming tool 230 comprises an axis of rotation 352 with an angle 360 between about 30 degrees and about 60 degrees with respect to golf club face 220, and in one embodiment, angle 360 is about 45 degrees. Exemplary orientations of groove forming tool axis of rotation 352 can also comprise angle 360 to be less than about 30 degrees and/or greater than about 60 degrees, but angle 360 is substantially greater than zero degrees and substantially less than 90 degrees. For example, angle 360 can be about 5 degrees or 85 degrees. In a different embodiment, angle 360 is between about 2 degrees and about 43 degrees, such as, for example, 35 degrees. The methods, apparatus, and articles of manufacture described herein are not limited in this regard. Groove forming tool 230 comprises a direction of rotation 350 that is clockwise, but direction of rotation 350 can comprise a counter-clockwise rotation, as well.

Among the various exemplary embodiments described herein, groove forming tool 230 can comprise different materials, for example, high speed steel, tungsten carbide, titanium carbide, and any other materials that can provide wear-resistance when forming exemplary grooves, such as grooves 240. Any other materials that exhibit beneficial shear or compression characteristics, depending on the needs of the manufacturer, are also contemplated by this disclosure.

As mentioned briefly above, golf club face 220 can comprise a plurality of parallel grooves 240 (FIG. 2). In one embodiment, grooves 240 can be formed by actuating groove forming tool 230 across golf club face 220, and then repositioning groove forming machine 231 comprising groove forming tool 230 to a subsequent location on golf club face 220. The groove milling, grinding, abrading, or cutting process is repeated until plurality of grooves 240 is formed. It should be noted that in a similar manner to the movement of groove forming machine 231 and golf club head 210 in direction 275 (FIG. 2), groove forming machine 231 and golf club head 210 can move in a lateral manner 370, with respect to one another, to further reposition groove forming tool 230 on golf club face 220.

Figure 4:
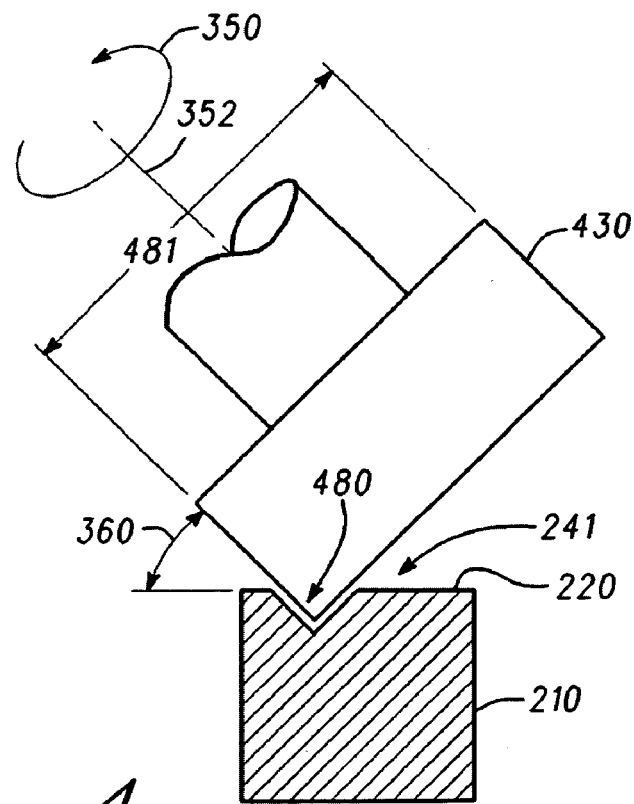
FIG. 4 depicts a close-up view of an exemplary groove forming tool engaged with a cross-section of a portion of a golf club face according to an embodiment of a method of manufacture described herein.

Turning to the next drawing, FIG. 4 depicts a close-up view of groove forming tool 430 engaged with a cross section of a portion of golf club head 210, including a symmetrical cross-section of groove 241. Rotating groove forming tool 430 can comprise rotating the groove forming tool 430 at a substantially constant velocity at a point of contact 480 with the golf club face 220. The groove forming tool velocity can comprise between about 45 surface meters per minute and about 800 surface meters per minute, and in some embodiments, the groove forming tool velocity comprises between about 90 surface meters per minute and about 300 surface meters per minute. Although exemplary velocities are disclosed herein, all embodiments are not limited in this regard. As can be seen in FIG. 4, the velocities disclosed here generally correspond to the velocities of the outermost perimeter of a cutting, milling, grinding, or abrading tip of groove forming tool 430, e.g., at point 480. Among the various exemplary embodiments described herein, groove forming tool comprises a diameter 481 between about 0.60 centimeters and about 3.1 centimeters. As explained briefly above, diameter 481 of groove forming tool 430 can comprise various diameters according to the needs of the manufacturer.

Groove forming tool 430 can also have other configurations. For example, groove forming tool 430 can have the configuration illustrated for groove forming tool 230 in FIGS. 2 and 3 where a cutting, milling, grinding, or abrading tip of the groove forming tool has a larger diameter than a body of the groove forming tool.

Figure 6:
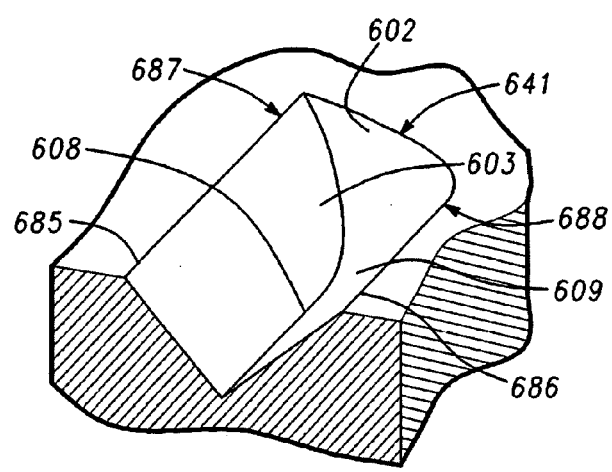

With reference to FIGS. 5 and 6 that depict close-up cross-section views of exemplary groove ends, the groove can have an elliptical portion at each groove end, for example elliptical portion 501 (FIG. 5) and elliptical portion 602 (FIG. 6). As described briefly above, exemplary embodiments can comprise the elliptical portion to be located outside of an impact region of the golf club face. The various embodiments can also comprise the groove ends to correspond to a first end, which can correspond to a toe region of the golf club face, and a second end, which can correspond to a heel region of the golf club face.

With reference to FIG. 5, exemplary groove 241 of grooves 240 shows sidewalls 585 and 586 being substantially straight and the top edge of sidewalls 585 and 586 being parallel to one another until elliptical portion 501. At elliptical portion 501, one sidewall remains generally straight, and the other sidewall curves. For example, FIG. 5 shows how sidewall 585 remains primarily straight at region 587, but sidewall 586 curves at region 588. Sidewall 585 is no longer parallel to sidewall 586 at elliptical portion 501.

Region 587 has sidewall 503, which is a portion of sidewall 585. Sidewall 503 is substantially straight. Region 588 has sidewall 509, which is a portion of sidewall 586. Sidewall 509 curves in an elliptical manner. In other embodiments, sidewall 509 is curved in a different shape, and/or is interchanged with sidewall 503. Sidewalls 585 and 586, and also sidewalls 503 and 509, meet at bottom 508 of groove 241. Among the various embodiments, bottom 508 comprises a curved axis along which groove 241 is symmetrical. The opposite end of groove 241 can be a mirror image of the end shown in FIG. 5.

Similarly, another exemplary embodiment shown in FIG. 6, shows exemplary groove 641 having sidewall 685 remaining substantially straight at region 687, but having sidewall 686 curving at region 688. Sidewall 685 is no longer parallel to sidewall 686 at elliptical portion 602. Also, similar to groove 241 of FIG. 5, groove 641 in FIG. 6 has region 687 with sidewall 603, which is a portion of sidewall 685 and is substantially straight. Region 688 of groove 641 has a sidewall 609, which is a portion of sidewall 686 curves in an elliptical manner. Groove 641 of FIG. 6 also comprises groove bottom 608. The opposite end of groove 641 can be a mirror image of the end shown in FIG. 6.

Figure 7:
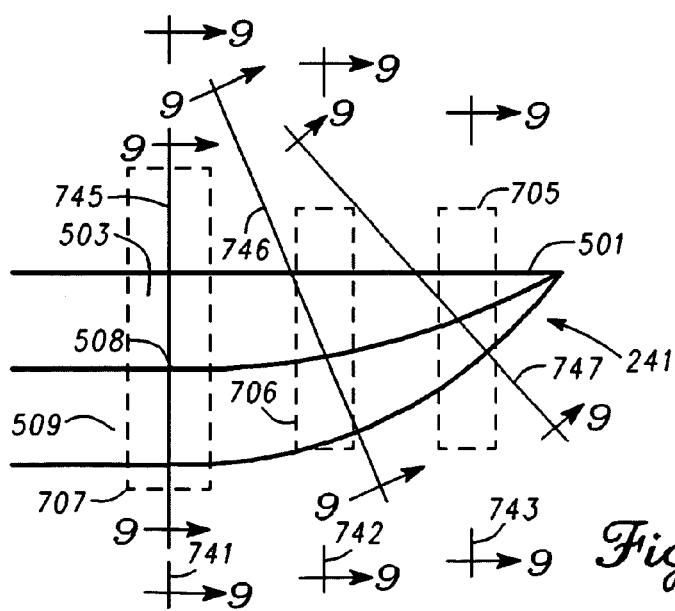
FIG. 7 depicts a top view of an elliptical portion of another exemplary groove according to another embodiment.
Figure 9:
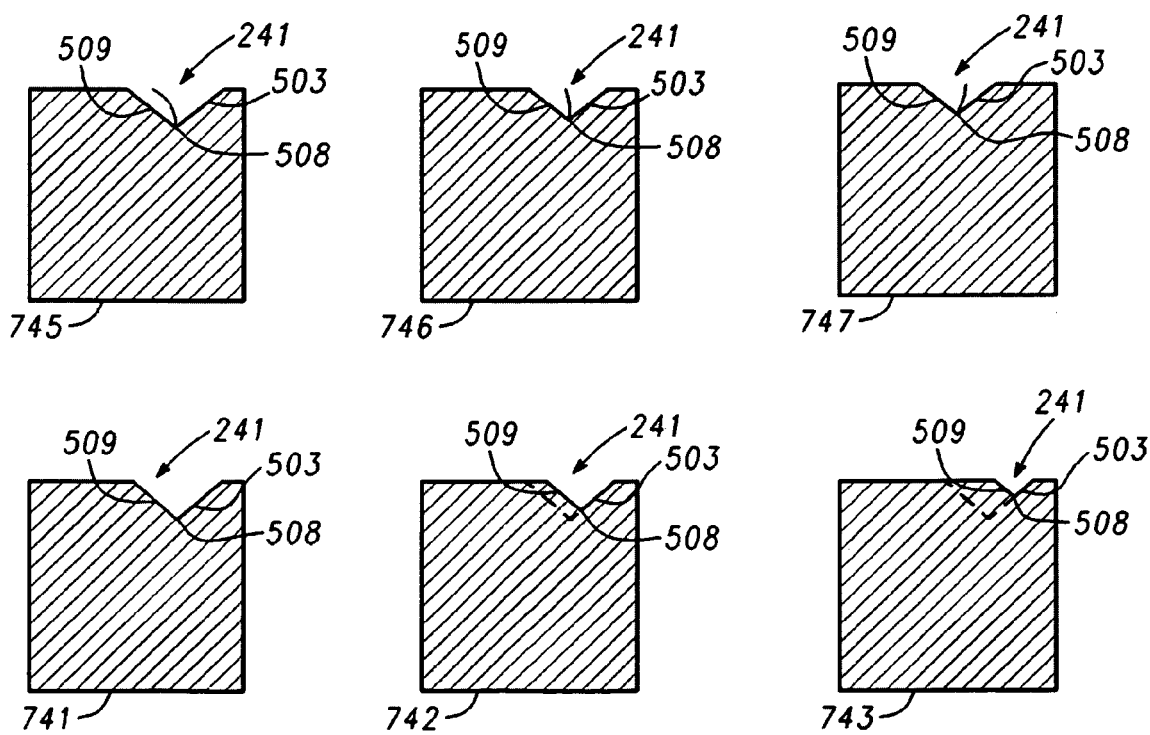
FIG. 9 depicts cross section views of the elliptical groove portions taken along different section lines 9-9 in FIG. 7.

Among the exemplary embodiments, FIG. 7 depicts a top view of a portion of golf club face 220 showing elliptical portion 501 from FIG. 5. Two sets of three cross sections of elliptical portion 501 are illustrated in FIG. 7. Cross sections 741, 742, and 743 of FIG. 7 form the first set of three cross sections and are illustrated in FIG. 9, and cross sections 745, 745, and 747 of FIG. 7 form the second set of three cross sections and are illustrated in FIG. 9. Cross sections 741 and 745 are cross sections of region 707 of elliptical portion 501, and cross sections 742 and 746 are cross sections of region 706 of elliptical portion 501.

Similarly, cross sections 743 and 747 are cross sections of region 705 of elliptical portion 501.

As seen in FIG. 9, cross sections 741, 742, and 743 are substantially proportional to each other and are symmetrical. Cross section 741 is taken perpendicular to a top edge of sidewall 503 in region 707, and cross section 742 is taken perpendicular to a top edge of sidewall 503 in region 706. Similarly, cross section 743 is taken perpendicular to a top edge of sidewall 503 in region 705.

As also seen in FIG. 9, cross sections 745, 746, and 747 are not substantially proportional to each other, but are symmetrical. Cross section 745 is taken perpendicular to bottom 508 in region 707, and cross section 746 is taken perpendicular to bottom 508 in region 706. Similarly, cross section 747 is taken perpendicular to bottom 508 in region 705.

Cross sections of the exemplary embodiment disclosed in FIG. 7 with respect to FIG. 5 are likewise applicable to the exemplary embodiment shown and described with respect to FIG. 6. Also, in the same or different embodiment, cross sections 741-743 are not perpendicular to bottom 508 or the top edge of sidewall 509, and cross sections 745-747 are not perpendicular to the top edge of sidewalls 503 or 509.

The term proportional refers to the similarity of the shapes and relationship of each exemplary reference element with one another. In the same way that similar triangles comprise similar respective angles, but different side lengths, such similar triangles are proportional to one another. Similarly in this disclosure, although dimensions can vary, e.g., lengths or heights of sidewalls, the overall shape is similar.

Figure 8:
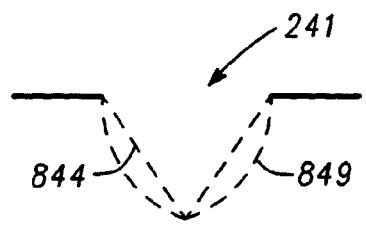
FIG. 8 depicts a cross section of an exemplary groove according to an embodiment.

As various exemplary groove embodiments are discussed in this disclosure, it should be noted that groove forming tool 230 (FIGS. 2 and 3) can be actuated in a single pass from first end 214 to second end 212, or vice versa, of golf club face 220. The single pass forms a groove comprising substantially straight sidewalls, such as depicted in FIG. 8 by reference number 844, which shows a symmetrical cross section of an exemplary groove.

In a different embodiment, a first non-symmetrical groove forming tool can be actuated in a first pass, e.g., from first end 214 to second end 212 of golf club face 220, or vice versa, and a second non-symmetrical groove forming tool that is different from the first non-symmetrical groove forming tool can be actuated in a second pass that is in an opposite direction from the first pass. The at least two passes can form a groove comprising substantially curved sidewalls, such as depicted in FIG. 8 by reference number 849. Other embodiments, though, can comprise multiple passes to form a straight walled groove, and a single pass to form a curved walled groove. The exemplary embodiments disclosed can provide grooves that conform to rules and/or standards defined by various golf standard organizations and/or governing bodies, but all embodiments are not limited in this regard.

Turning now to FIG. 9, FIG. 9 depicts cross section views of the elliptical groove portions taken along different section lines 9-9 in FIG. 7. The elements depicted in FIG. 9 depict the cross sections of the exemplary groove portions of the exemplary one of grooves 240. Cross sections 741-743 depict the similarity or proportionality of the groove as the cross sections progress along the length of the groove, when each of cross sections 741-743 are taken perpendicular to a top edge of sidewall 503. Cross sections 745-747 depict the dissimilarity or non-proportionality of the groove as the cross sections progress along the length of the groove, when each of cross sections 745-747 are taken perpendicular to bottom 508 and/or a top edge of sidewall 509.

Figure 10:
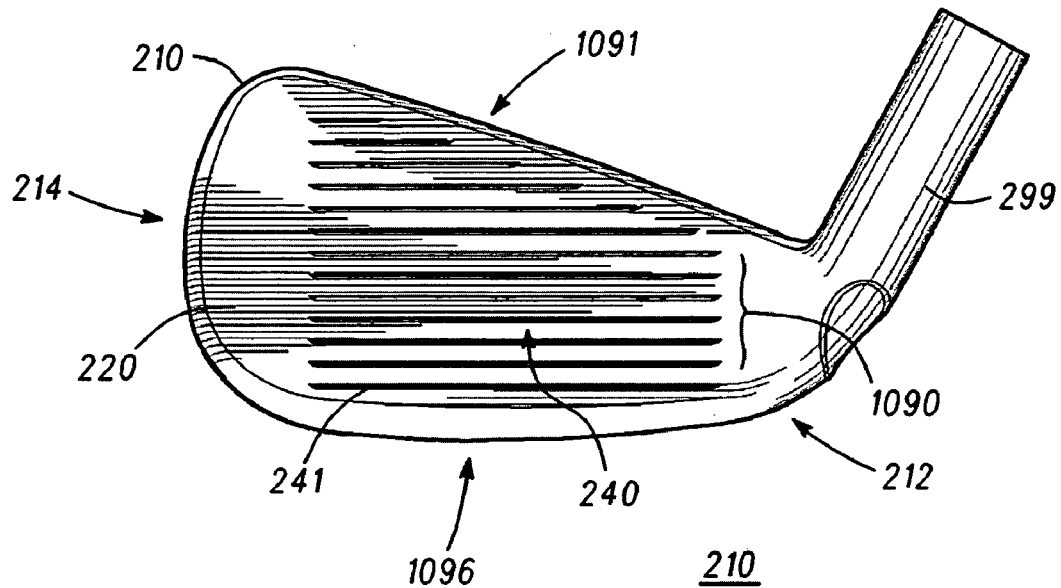
FIG. 10 depicts a front view of a golf club head showing groove end portions tapering toward a top rail of the golf club head.
Figure 11:
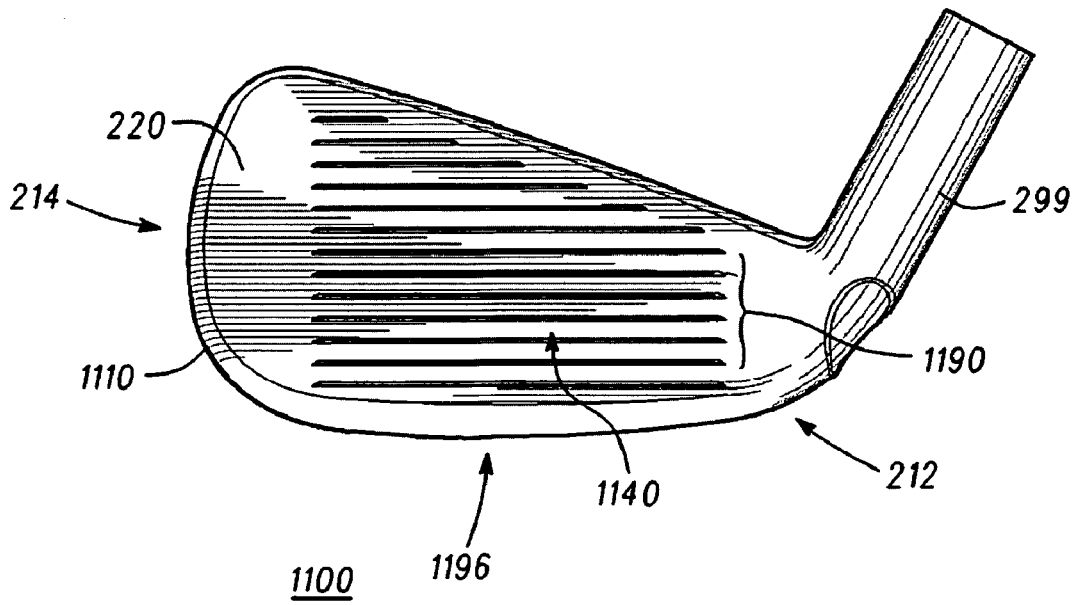
FIG. 11 depicts a front view of a golf club head showing groove end portions tapering toward a sole of the golf club head.

FIGS. 10 and 11 depict front views of exemplary golf club heads 210 and 1110, respectively, showing grooves 240 and 1140, respectively, on front face 220. The nature of the groove forming technique described herein results in the groove ends comprising elliptical configurations. In that regard, FIGS. 10 and 11 further depict groove ends 1090 and groove ends 1190 that taper. For example, in one embodiment, groove ends 1090 in FIG. 10 taper towards a rail region 1091 of golf club head 210. In another embodiment, groove ends 1190 of FIG. 11 taper towards sole region 1196 of golf club head 1110. In some situations, the embodiment illustrated in FIG. 11 is advantageous over the embodiment illustrated in FIG. 10 because groove ends 1190 in FIG. 11 are less likely to reflect light into a person's eyes than groove ends 1090 in FIG. 10 when the golf clubs are held in an address position. In other situations, the embodiment illustrated in FIG. 10 is advantageous over the embodiment illustrated in FIG. 11 because groove ends 1090 in FIG. 10 can have a better grip on a golf ball than groove ends 1190 in FIG. 11 if the golf ball impacts golf club face 220 closer to first end 212 or second end 214 than a center portion of golf club face 220.

These two exemplary embodiments are not limited in this regard, though, and other embodiments can comprise other configurations of groove end orientations. For example, instead of having each of groove ends 1090 in FIG. 10 taper towards rail region 1091, groove ends 1090 can taper towards rail region 1091 at heel region 212, and groove ends 1090 can taper towards sole region 1096 at toe region 214, or vice versa. Additionally, alternating ones of groove ends 1090 in FIG. 10 can taper towards rail region 1091 while the other ones of groove ends 1090 taper towards sole region 1096, or the top half of groove ends 1090 taper towards rail region 1091 while the bottom half of groove ends 1090 taper towards sole region 1096, or vice versa.

Also regarding FIG. 10, grooves 240 with groove ends 1090 can be milled, ground, abraded or otherwise cut using the groove forming machine 231 (FIGS. 2 and 3). More specifically, referring to FIG. 2, to mill, grind, abrade, or otherwise cut grooves 240 with groove ends 1090, club head 210 in which grooves 240 are formed is positioned such that hosel 299 points generally in one direction ("up") while groove forming tool 230 of groove forming machine 231 points generally in an opposition direction ("down").

Regarding FIG. 11, grooves 1140 with groove ends 1190 can be milled, ground, abraded, or otherwise cut using a machine similar to groove forming machine 231 (FIGS. 2 and 3), except that groove forming machine 231 (or club head 1100 having grooves 1140) is rotated one hundred eighty degrees from the orientation illustrated in FIGS. 2 and 3. More specifically, to mill, grind, abrade, or otherwise cut grooves 1140 with groove ends 1190, club head 1100 in which grooves 1140 are formed is rotated one hundred eighty degrees from the orientation of club head 210 illustrated in FIG. 2 such that hosel 299 of club head 1100 points generally in the "down" direction while groove forming tool 230 remains pointed generally in the "down" direction. In a another embodiment, to mill, grind, abrade, or otherwise cut grooves 1140 with groove ends 1190, club head 1100 in which grooves 1140 are formed remains in the same orientation that club head 210 is oriented in FIG. 2, but groove forming machine 231 is rotated one hundred eighty degrees from the orientation shown in FIG. 2 such that groove forming tool 230 of groove forming machine 231 point generally in the "up" direction.

Figure 12:
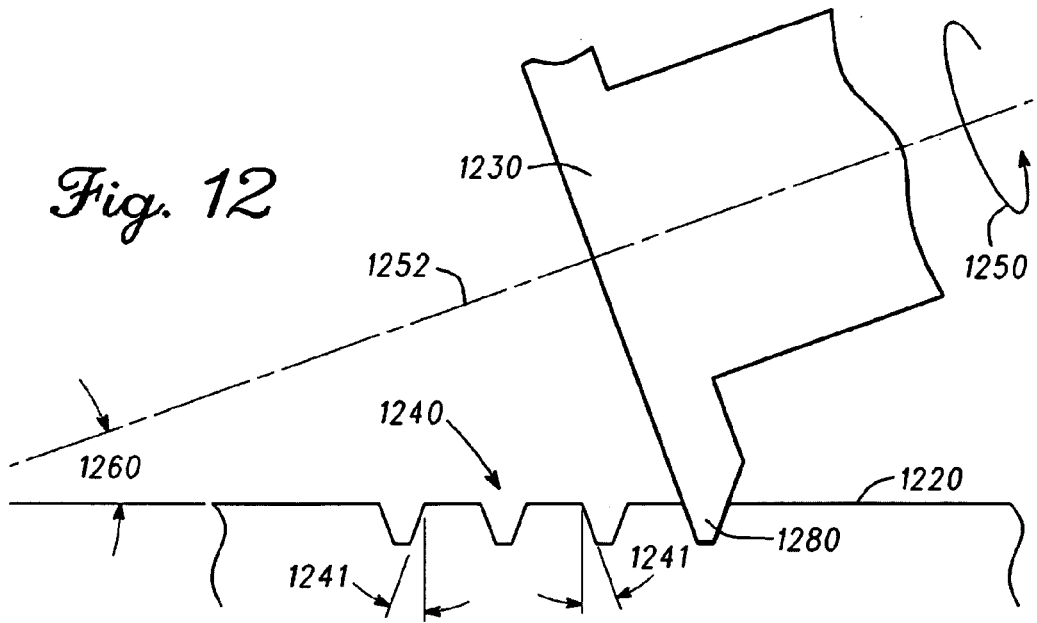
FIG. 12 depicts a close-up view of another exemplary groove forming tool engaged with a cross-section of a portion of a golf club face according to an embodiment of a method of manufacture described herein.

FIG. 12 depicts a close-up view of groove forming tool 1230 engaged with a cross-section of a portion of golf club face 1220. Groove forming tool 1230 can be similar to groove forming tool 230 (FIGS. 2 and 3) and groove forming tool 430 (FIG. 4). For example, groove forming tool 1230 has an axis of rotation 1252 and a direction of rotation 1250, which are similar to axis of rotation 352 and direction of rotation 350, respectively, in FIGS. 3 and 4. Groove forming tool 1230 also has one or more points of contact 1280, which are similar to point of contact 480 in FIG. 4.

Groove forming tool 1230 mills, grinds, abrades, or otherwise cuts grooves 1240 into golf club face 1220. Grooves 1240 and golf club face 1220 can be similar to grooves 240 and golf club face 220, respectively, in FIG. 2. Grooves 1240 have sidewalls at an angle 1241, which is measured from a line perpendicular to golf club face 1220. To form grooves 1240, axis of rotation 1252 of groove forming tool 1230 can be at angle 1260 from golf club face 1220. Angle 1260 is measured between axis rotation 1252 and golf club face 1220. Angle 1260 can also be measured between axis rotation 1252 and the surface at the distal end of points of contact 1280. In one embodiment, groove forming tool 1230 is aligned relative to golf club face 1220 such that the surface at the distal end of points of contact 1280 is parallel to golf club face 1220.

As explained in more detail with reference to FIGS. 13 and 14, in one embodiment, angles 1241 and 1260 can each be approximately twenty degrees, and in a different embodiment, angles 1241 and 1260 can each be approximately five degrees. In another embodiment, angles 1241 and 1260 can each be between approximately two and forty-three degrees.

Figure 13:
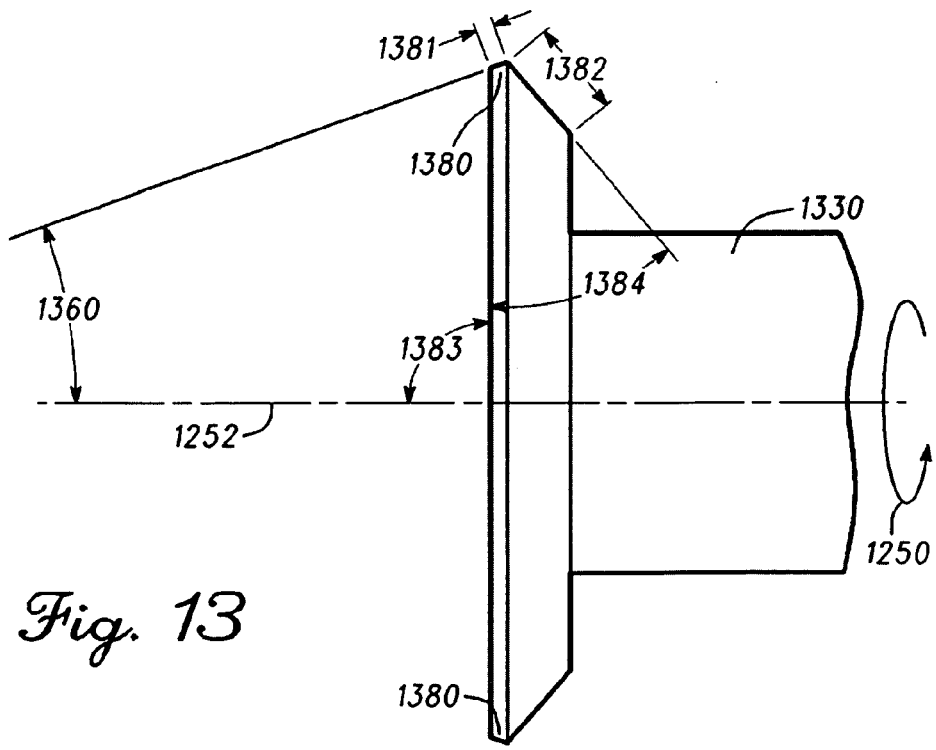
FIG. 13 depicts a side view of a first groove forming tool according to the embodiment of FIG. 12.

FIG. 13 depicts a side view of groove forming tool 1330, which is an embodiment of groove forming tool 1230 in FIG. 12. Groove forming tool 1330 comprises one or more points of contact 1380, which are similar to points of contact 1280 in FIG. 12. The portion of groove forming tool 1330 that forms one or more points of contact 1380 can be a continuous disk or can have one or more spikes or other protrusions extending from an axial or other central portion.

Groove forming tool 1330 also comprises angles 1360, 1383, and 1384. Angle 1360 is measured between axis of rotation 1252 of groove forming tool 1330 and the surface at the distal end of points of contact 1380, as shown in FIG. 13. Angle 1360 can be approximately the same as angle 1260 (FIG. 12) because when groove forming tool 1330 is used to form a groove in a golf club face, the surface of the distal end of points of contact 1380 can be aligned to be approximately parallel to the golf club face. Angle 1383 is measured between axis of rotation 1252 of groove forming tool 1330 and a surface of groove forming tool 1330 that defines a side of points of contact 1380, as shown in FIG. 13. Angle 1384 is measured between two surfaces of groove forming tool 1330 that define opposite sides of points of contact 1380, as shown in FIG. 13. In one embodiment, angle 1360 is approximately twenty degrees; angle 1383 is approximately ninety degrees; and angle 1384 is approximately forty degrees. In this embodiment, angle 1241 (FIG. 12) of the grooves formed in the golf club face is approximately twenty degrees.

Figure 14:
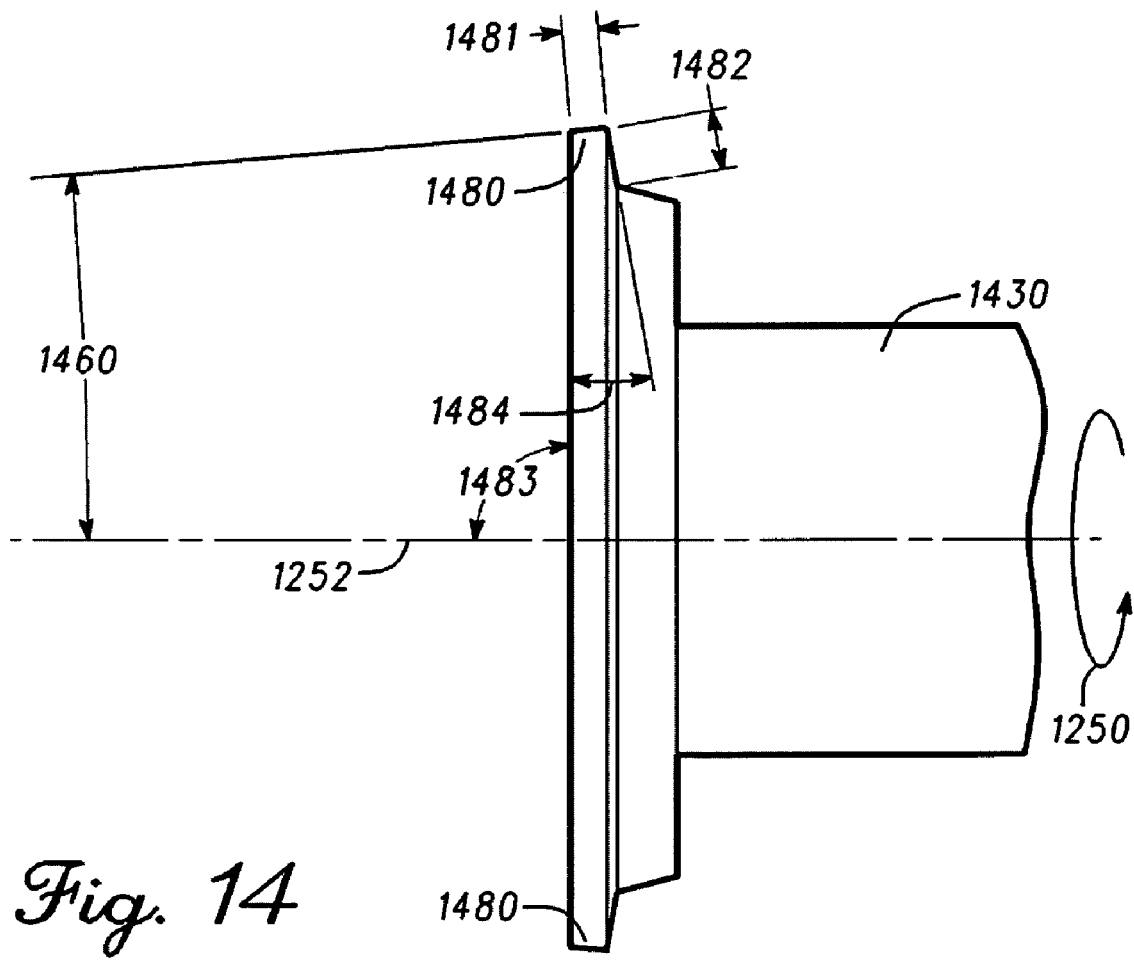
FIG. 14 depicts a side view of a second groove forming tool according to the embodiment of FIG. 12.

FIG. 14 depicts a side view of groove forming tool 1430, which is another embodiment of groove forming tool 1230 in FIG. 12. Groove forming tool 1230 in FIG. 12 is not limited to the embodiments described with reference to FIGS. 13 and 14.

Groove forming tool 1430 comprises one or more points of contact 1480, which are similar to points of contact 1280 in FIG. 12. The portion of groove forming tool 1430 that forms one or more points of contact 1480 can be a continuous disk or can have one or more spikes or other protrusions extending from an axial or other central portion. Groove forming tool 1430 also comprises angles 1460, 1483, and 1484, which are similar to angles 1360, 1383, and 1384 in FIG. 13. In one embodiment, angle 1460 is approximately five degrees; angle 1483 is approximately ninety degrees; and angle 1484 is approximately ten degrees. In this embodiment, angle 1241 (FIG. 12) of the grooves formed in the golf club face is approximately five degrees.

This disclosure of exemplary embodiments of a golf club method and article is intended to be illustrative of the scope of a golf club method and article, and is not intended to be limiting. For example, in one embodiment, a golf club head and method of manufacture can have one or more features of FIGS. 2 and 3 with or without the features described with reference to FIGS. 5-7 and 9-11. Similarly, in different embodiments, a golf club can have one or more of the features of FIGS. 5 or 6 with or without the features of FIGS. 7 and 9-11, and a golf club can have one or more of the features of FIGS. 3 or 4 with or without the features of FIGS. 7 and 9-11. It is intended that the scope of golf club method and article shall be limited only to the extent required by the appended claims.

The article, system, and method discussed herein can be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of a golf club head and method of manufacture, and can disclose alternative embodiments of a golf club head and method of manufacture.

All elements claimed in any particular claim are essential to a golf club head and method of manufacture claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method for manufacturing a golf club head comprising:
    providing a golf club head comprising a golf club face; and
    forming a groove on the golf club face comprising:
        rotating a groove forming tool about an axis of rotation at an angle substantially greater than zero degrees and substantially less than 90 degrees to the golf club face; and
        actuating the groove forming tool at the angle from a first end to a second end of the golf club face to cut the groove into the golf club face,
    wherein:
    the groove forming tool comprises a length less than a height of the golf club face;

the length of the groove forming tool comprise a length of a cutting end and a length of a shaft coupling the cutting end to a groove forming machine;

rotating the groove forming tool comprises rotating all of the length of the groove forming tools about the axis; and the groove forming tool comprises a diameter between about 0.60 centimeters and about 3.1 centimeters.

2. The method of claim 1, wherein a first end of the groove comprises an elliptical portion.

3. The method of claim 1, wherein rotating the groove forming tool comprises rotating the groove forming tool at a substantially constant velocity at a point of contact with the golf club face.

4. The method of claim 1, wherein rotating the groove forming tool comprises providing the angle to be between about 2 degrees and about 43 degrees to the golf club face.

5. The method of claim 1, wherein rotating the groove forming tool comprises rotating the groove forming tool at a velocity between about 45 surface meters per minute and about 800 surface meters per minute.

6. The method of claim 1, wherein the first end corresponds to a toe region of the golf club face and the second end corresponds to a heel region of the golf club face.

7. The method of claim 1, wherein the groove is substantially symmetric about a bottom of the groove.

8. The method of claim 1, wherein actuating the groove forming tool further comprises actuating the groove forming tool in a single pass from the first end to the second end of the golf club face.

9. The method of claim 8, wherein the single pass forms the groove comprising substantially straight sidewalls.

10. The method of claim 1, wherein actuating the groove forming tool further comprises actuating different groove forming tools in at least two passes from the first end to the second end of the golf club face.

11. The method of claim 10, wherein the at least two passes forms the groove comprising substantially curved sidewalls.

12. The method of claim 1, wherein a cross-section of a portion of the groove forming tool is symmetric with a cross-section of the groove.

13. A method for manufacturing a golf club head comprising:

providing a golf club head comprising a golf club face; and forming a groove on the golf club face comprising:

rotating a groove forming tool about an axis of rotation at an angle substantially greater than zero degrees and substantially less than 90 degrees to the golf club face; and actuating the groove forming tool at the angle from a first end to a second end of the golf club face, wherein:

forming the groove comprises providing the groove to comprise:

a first cross section of a first region of an elliptical portion of the groove taken perpendicular to an edge of a first sidewall of the first region of the groove, wherein the first cross section is symmetrical;

a second cross section of a second region of the elliptical portion taken perpendicular to an edge of a first sidewall of the second region of the groove, wherein the first cross section is substantially proportional to the second cross section and wherein the second cross section is symmetrical;

a third cross section of the first region of the elliptical portion taken perpendicular to a bottom of the first region of the groove, wherein the third cross section is symmetrical; and a fourth cross section of the second region of the elliptical portion taken perpendicular to a bottom of the second region of the groove, wherein the third cross section is substantially not proportional to the fourth cross section and wherein the fourth cross section is symmetrical.

14. The method of claim 13, wherein a first end of a groove is a mirror image of a second end of the groove.

15. The method of claim 13, wherein a cross-section of a portion of the groove forming tool is symmetric with a fifth cross-section of the groove.

16. The method of claim 13, wherein the groove forming tool comprises a length less than a height of the golf club face; the length of the groove forming tool comprise a length of a cutting end and a length of a shaft coupling the cutting tool to a groove forming machine; and rotating the groove forming tool comprises rotating all of the length of the groove forming tool about the axis.

17. The method of claim 13, wherein: the groove forming tool comprises a diameter between about 0.60 centimeters and about 3.1 centimeters.

18. The method of claim 13, wherein rotating the groove forming tool comprises providing the angle to be between about 2 degrees and about 43 degrees to the golf club face.

19. The method of claim 13, wherein rotating the groove forming tool comprises rotating the groove forming tool at a velocity between about 45 surface meters per minute and about 800 surface meters per minute.

20. The method of claim 13, wherein the first end corresponds to a toe region of the golf club face and the second end corresponds to a heel region of the golf club face.

21. The method of claim 13, wherein actuating the groove forming tool further comprises actuating different groove forming tools in at least two passes from the first end to the second end of the golf club face.

* * * * *